July 7, 1942.                    C. E. BASTON                    2,289,171
                         SPEED RESPONSIVE DEVICE
                          Filed Feb. 20, 1940
Fig. 1.
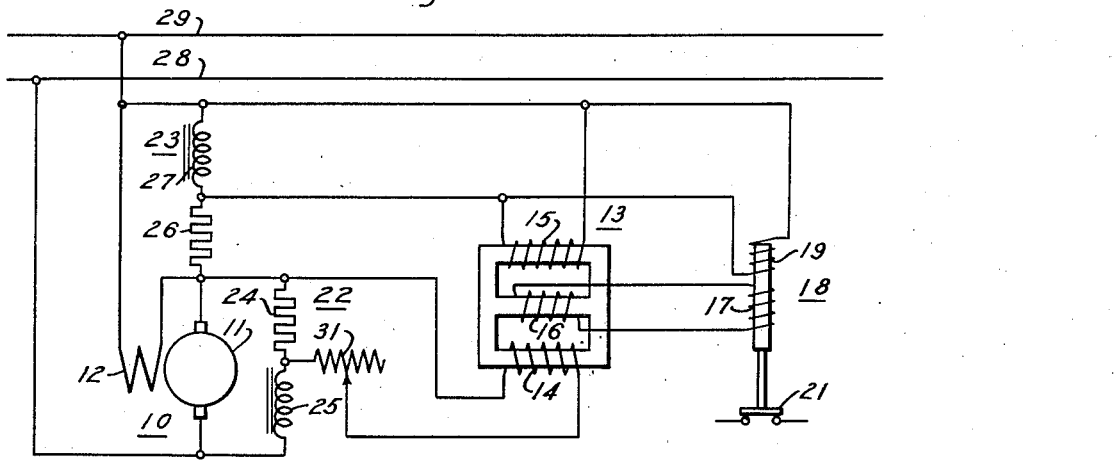
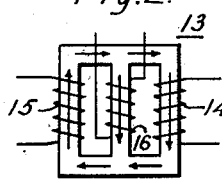
Field Voltage
Predominating
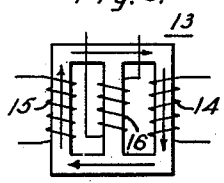
Field Voltage
Equal to
Armature Voltage
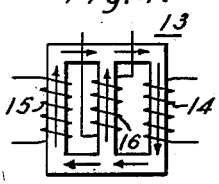
Armature Voltage
Predominating
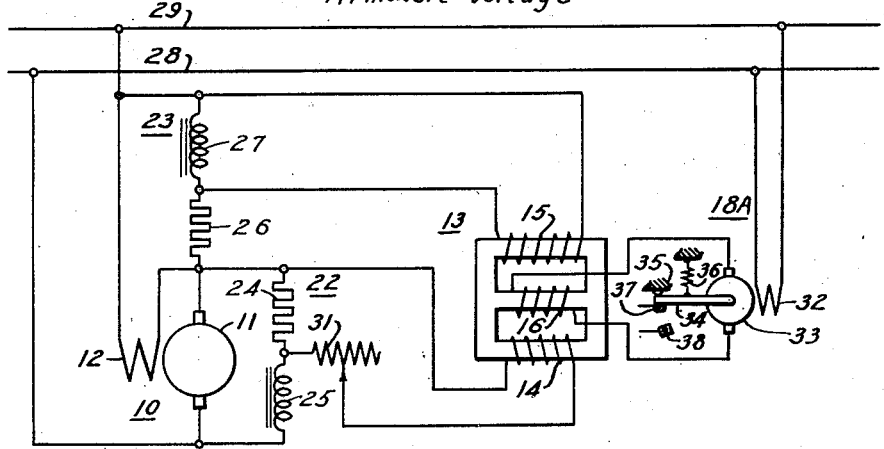
Fig. 5.
WITNESSES:                                         INVENTOR
                                                 Cyril E. Baston.
                                                 BY
                                                      ATTORNEY Patented July 7, 1942

2,289,171

UNITED STATES PATENT OFFICE 2,289,171

SPEED RESPONSIVE DEVICE

Cyril E. Baston, Forest Hills, Pa., assignor to Westinghouse Electric & Manufacturing Company, East Pittsburgh, Pa., a corporation of Pennsylvania Application February 20, 1940, Serial No. 319,875

5 Claims. (Cl. 175—355)

My invention relates, generally, to speed responsive devices and, more particularly, to devices responsive to the speed of rotation of alternating-current motors.

Alternating-current traction motors of the series commutator type require inductive shunts across their interpole, or commutating pole, field windings in order to obtain most satisfactory commutation. Furthermore, the impedance of the shunts must be changed as the speed of the motor changes. Formerly, relays of two different types have been utilized to control the operation of switches which change the impedance of the shunts. One is of the double-coil balanced-beam type and the other is a power-factor relay utilizing a motor element. The foregoing relays are relatively large in size and complicated in structure.

An object of my invention, generally stated, is to provide a speed-responsive device which shall be simple in structure, efficient in operation and which may be economically manufactured and installed.

A more specific object of my invention is to provide for utilizing a simple electromagnetic device as a speed responsive element in a speed responsive device.

A further object of my invention is to provide a speed responsive device which may be readily adjusted to be responsive to different speeds.

Other objects of my invention will be explained fully hereinafter or will be apparent to those skilled in the art.

The operation of the present invention is based on the principle that with a given field flux, the counter-electromotive force generated in a motor armature is proportional to the speed of the armature. The voltage drop across the field winding of the motor is proportional to the field flux and this voltage is applied through a phase correcting network to one winding of a three-winding transformer. The voltage across the armature is proportional to the counter-electromotive force and is applied through a phase-correcting network to a second winding of the three-winding transformer. The third winding of the transformer is connected to the operating winding of an electromagnetic device which is operated when the motor is rotating at a predetermined speed.

For a fuller understanding of the nature and objects of the invention, reference may be had to the following detailed description, taken in conjunction with the accompanying drawing, in which:

Figure 1 is a diagrammatic view of a speed-responsive device embodying my invention;

Figs. 2, 3 and 4 are diagrammatic views illustrating the method of operation of the device, and Fig. 5 is a diagrammatic view of a modification of the invention shown in Fig. 1.

Referring to the drawing and particularly to Fig. 1, the system shown therein comprises a motor 10 having an armature winding 11 and a series field winding 12, a transformer 13 having one winding 14 connected across the armature 11, a second winding 15 connected across the series field winding 12 and a third winding 16 which is connected to an operating winding 17 of an electromagnetic device 18. In Fig. 1 the electromagnetic device 18 is illustrated as a relay which is provided with a polarizing winding 19 in addition to the operating winding 17. The winding 19 is also connected across the field winding 12 of the motor 10. The relay 18 is provided with contact members 21 which are actuated when the windings 17 and 19 are properly energized, as will be explained more fully hereinafter. The contact members 21 may be utilized to control the operation of switches (not shown) for changing the impedance of interpole field shunts for the motor 10, as explained hereinbefore.

In order that the phase relation of the voltages applied to the windings 14 and 15 of the transformer 13 may be properly adjusted, phase-correcting networks 22 and 23 are interposed in the circuits for the windings 14 and 15, respectively. As shown, the phase-correcting network 22 comprises a resistor 24 and a reactor 25. The network 23 likewise comprises a resistor 26 and a reactor 27. However, networks comprising a resistor and a capacitor may be utilized, if desired, to adjust the phase relation of the voltages applied to the transformer 13, as will be understood.

The motor 10 may be of the series commutator type and is supplied with power through conductors 28 and 29, which may be connected to any suitable source of alternating-current power (not shown).

As explained hereinbefore, the voltage drop across the field winding 12 is proportional to the field flux. Consequently, the voltage applied to the winding 15 of the transformer 13 is proportional to the field flux of the motor 10. Likewise, the voltage applied to the winding 14 of the transformer 13 is proportional to the counter-electromotive force of the motor 10 which, in turn, is proportional to the rotational speed of the armature 11 of the motor.

Referring to the sketches shown in Figs. 2, 3 and 4, it will be seen that the voltage supplied to the operating winding 17 of the relay 18 by the transformer 13 is of a fairly high value when the motor is at a standstill and the field voltage is predominant. The relay voltage decreases to zero as the motor speed increases until the motor field voltage applied to the winding 15 is equal to the counter-electromotive force of the motor which is applied to the winding 14. As the motor speed increases, the counter-electromotive force increases and the voltage applied to the relay winding 17 also increases, but the relay voltage is shifted in phase 180 electrical degrees. It is the shifting in phase of the voltage applied to the relay which makes the operation of the relay possible.

As shown by the arrows in Fig. 2, the windings 14 and 15 are so disposed on the outer legs of the transformer 13 that the fluxes induced by these windings are in opposite directions. Thus, when the flux induced by the winding 15 exceeds that induced by the winding 14, the difference flows through the middle leg of the transformer in a downward direction, as indicated by the arrow on the middle leg.

As shown in Fig. 3, when the voltages applied to the windings 14 and 15 are equal and the flux induced by these windings is equal, no flux flows through the middle leg of the transformer and consequently no voltage is induced in the winding 16. When the voltage applied to the winding 14, which is proportional to the counter-electromotive force of the motor, is greater than the voltage applied to the winding 15, which is proportional to the field flux of the motor, the flux induced by the winding 14 exceeds the flux induced by the winding 15. Consequently, a flux flows through the middle leg of the transformer in an upward direction, as indicated by the arrow in Fig. 4, and the voltage induced in the winding 16 is in the opposite direction from that shown in Fig. 2. Therefore, current flows through the winding 17 of the relay 18 in the opposite direction from that under the conditions illustrated in Fig. 2.

Since the voltage applied to the polarizing winding 19 of the relay 18 does not change in phase relation, the polarizing winding provides a certain number of ampere-turns tending to lift the relay armature. When the motor is at a standstill, the voltage supplied to the winding 17 by the transformer 13 provides an equal and opposite number of ampere turns and the resulting force on the relay armature is zero. As the motor speed increases and consequently the voltage applied to the winding 17 decreases, as explained hereinbefore, the net ampere-turns on the relay increases until the relay operating coil ampere-turns become zero. When the voltage applied to the relay coil changes its phase relation and begins to increase, the ampere-turns provided by the coil 17 are added to those supplied by the coil 19 and, when the net ampere-turns reach the correct value, the relay is operated.

It will be understood that the operating characteristics of the relay 18 may be changed by so designing the transformer 13 that parts of the magnetic circuit saturate under predetermined conditions. Also, the characteristics of the relay may be changed to operate at different motor speeds by inserting a variable impedance 31 in the circuit for the winding 14 of the transformer 13, as shown in Fig. 1. The impedance 31 may be utilized to adjust the voltage applied to the winding 14, thereby causing the relay 18 to operate at different predetermined motor speeds.

In the modification of the invention shown in Fig. 5, in which like parts are designated by the same reference characters as in Fig. 1, the electromagnetic device 18a comprises a torque motor having a stator winding 32 and a rotor winding 33. The rotor 33 actuates a contact arm 34 which is normally biased against a stop 35 by a spring 36. The stator winding 32 may be connected directly to the power conductors 28 and 29, as shown. The rotor winding 33 is connected to the transformer winding 16 in a manner similar to the operating winding 17 of the relay 18, as explained hereinbefore.

With the connections illustrated, the motor torque is exerted backwardly (against the stop 35) as long as the field voltage which is applied to the winding 15 of the transformer 13 predominates over the counter-electromotive force of the motor 10 which is applied to the winding 14, as described hereinbefore. When the voltages applied to the windings 14 and 15 are equal, the torque of the rotor 33 is zero. When the voltage applied to the winding 14 is greater than that applied to the winding 15 of the transformer 13, the rotor torque reverses, thereby operating the torque arm 34 against the tension of the spring 36 to cause a contact member 37, carried by the torque arm 34, to engage a contact member 38.

The operating characteristics of the torque motor may be changed by adjusting the variable impedance 31, as explained hereinbefore, or they may be changed by varying the tension of the spring 36, thereby causing the torque motor to operate at different speeds of the motor 10.

From the foregoing description, it is apparent that I have provided a speed-responsive device which is simple in structure, as standard apparatus well known in the electrical art may be utilized in constructing the device. Also, the electromagnetic device is positive in operation, since its operation depends upon a reversal of the phase relation of the voltage applied to one of its windings and is not dependent upon a gradual increase or decrease in the voltage applied to the windings of the device, as in previously known systems.

Furthermore, it is apparent that two or more electromagnetic devices having different operating characteristics may be energized from the same transformer, thereby providing for the sequential operation of control apparatus at predetermined increments in the rotational speed of a motor during its accelerating period.

I do not desire to be restricted to the particular form or arrangement of parts herein shown and described, since it is evident that they may be changed and modified without departing from the spirit and scope of my invention, as defined in the appended claims.

I claim as my invention:

1. A device responsive to the speed of an electric motor having an armature winding and a field winding comprising, in combination, a transformer having a plurality of windings and an electromagnetic device having an operating winding energized from said transformer, said transformer having one winding connected across the field winding of the motor, a second winding connected across the armature winding of the motor, said windings being so disposed that the fluxes induced thereby are in opposite directions, and a third winding connected to the operating winding on the electromagnetic device, said third winding being energized by the difference in the fluxes of the first two windings, and phase-correcting devices interposed in the circuits for the first two windings on the transformer, whereby said device is responsive to a predetermined speed of the motor.

2. A device responsive to the speed of an electric motor having an armature winding and a field winding comprising, in combination, a transformer having a plurality of windings and an electromagnetic device having an operating winding energized from said transformer, said transformer having one winding connected across the field winding of the motor, a second winding connected across the armature winding of the motor, said windings being so disposed that the fluxes induced thereby are in opposite directions, and a third winding connected to the operating winding on the electromagnetic device, said third winding being energized by the difference in the fluxes of the first two windings, phase-correcting devices interposed in the circuits for the first two windings on the transformer, whereby said device is responsive to a predetermined speed of the motor, and means for adjusting the voltage applied to one winding of the transformer thereby changing the operating characteristics of the electromagnetic device.

3. A device responsive to the speed of an electric motor having an armature winding and a field winding comprising, in combination, a transformer having a plurality of windings and an electromagnetic device having a polarizing winding and an operating winding, said transformer having one winding connected across the field winding of the motor, a second winding connected across the armature winding of the motor, said windings being so disposed that the fluxes induced thereby are in opposite directions, and a third winding connected to the operating winding on the electromagnetic device, said third winding being energized by the difference in the fluxes of the first two windings, and phase-adjusting devices disposed in the circuits for the first two windings on the transformer, whereby said polarizing winding and said operating winding cooperate to operate said device at a predetermined motor speed.

4. A device responsive to the speed of an electric motor having an armature winding and a field winding comprising, in combination, a transformer having a plurality of windings and an electromagnetic device having a polarizing winding and an operating winding, said transformer having one winding connected across the field winding of the motor, a second winding connected across the armature winding of the motor, said windings being so disposed that the fluxes induced thereby are in opposite directions, and a third winding connected to the operating winding on the electromagnetic device, said third winding being energized by the difference in the fluxes of the first two windings, and phase-adjusting devices disposed in the circuits for the first two windings on the transformer, said polarizing winding being connected across said motor field winding, whereby said polarizing winding and said operating winding cooperate to operate said device at a predetermined motor speed.

5. In a speed-responsive system, in combination, an electric motor having an armature winding and a field winding, a transformer having one winding connected across said field winding and a second winding connected across said armature winding, the flux induced by the second winding being opposite in direction to the flux induced by the first winding, phase-correcting devices disposed in the circuits for said windings, and an electromagnetic device having contact members, an operating winding and a polarizing winding cooperating with the operating winding to actuate the contact members, said transformer having a third winding for energizing said operating winding, the energization of said third winding being proportional to the difference in the fluxes of the first two windings, whereby said contact members are actuated at a predetermined motor speed.

CYRIL E. BASTON.